(12) United States Patent
Aoki et al.

(10) Patent No.: US 8,296,090 B2
(45) Date of Patent: Oct. 23, 2012

(54) GAS ANALYZER

(75) Inventors: Junji Aoki, Kyoto (JP); Hirokazu Kitaura, Wakayama (JP); Said Boumsellek, San Diego, CA (US)

(73) Assignee: Horiba STEC, Co., Ltd., Kyoto-shi (JP)

( * ) Notice: Subject to any disclaimer, the term of this patent is extended or adjusted under 35 U.S.C. 154(b) by 415 days.

(21) Appl. No.: 12/595,821

(22) PCT Filed: Apr. 2, 2008

(86) PCT No.: PCT/JP2008/056591
§ 371 (c)(1),
(2), (4) Date: Oct. 13, 2009

(87) PCT Pub. No.: WO2008/129929
PCT Pub. Date: Oct. 30, 2008

(65) Prior Publication Data
US 2010/0076712 A1  Mar. 25, 2010

(30) Foreign Application Priority Data
Apr. 13, 2007  (JP) ................................. 2007-105648

(51) Int. Cl.
*G01L 27/00* (2006.01)
*G01L 15/00* (2006.01)
(52) U.S. Cl. ............. 702/98; 702/99; 702/121; 702/189
(58) Field of Classification Search ............ 702/98–100, 702/121, 123, 179–189
See application file for complete search history.

(56) References Cited

U.S. PATENT DOCUMENTS
5,889,281 A * 3/1999 Holkeboer et al. ........... 250/282

FOREIGN PATENT DOCUMENTS
| JP | 61-128139 | | 6/1986 |
| JP | 11-031473 | * | 2/1999 |
| JP | 2000-097910 | | 4/2000 |
| JP | 2001-165907 | | 6/2001 |
| JP | 2001-351568 | | 12/2001 |
| JP | 2006-266854 | | 10/2006 |

OTHER PUBLICATIONS

ISA/Japanese Patent Office, International Search Report of PCT/JP2008/056591, Jun. 3, 2008, 2pages, Japan.
Horiba Technical Reports, Pressure Master RGA series, Mar. 2004, 4 pages, published in Japanese, with English explanation of relevance.

* cited by examiner

*Primary Examiner* — Phuong Huynh
(74) *Attorney, Agent, or Firm* — Alleman Hall McCoy Russell & Tuttle LLP

(57) ABSTRACT

A gas analyzer using a quadrupole mass spectrometric method etc. is provided with an ionizer to ionize a sample gas, a first ion detector and a second ion detector each configured to detect a respective ion from ionizer, and each being disposed a respective distance from the ionizer on an opposite side of the ionizer, the respective distances being different from each other, a filter interposed between the ionizer and the first ion detector to selectively allow ions from the ionizer to pass therethrough, and an arithmetic device to correct a partial pressure of a specific component obtained from the first ion detector and selected by the filter by using a first total pressure of the sample gas obtained from the first ion detector and a second total pressure of the sample gas obtained from the second ion detector.

7 Claims, 6 Drawing Sheets

GAS ANALYZER

FIELD OF THE ART

The present invention relates to a gas analyzer, particularly a method of correcting a measurement pressure of a gas analyzer using a quadrupole mass spectrometric method and the like.

BACKGROUND ART

A residual gas analyzer of this kind is known as including: an ionizer; a mass spectrometer; a sensor unit provided with a sensor having a detector and an AC generator unit; and a device main body connected by a cable with respect to the sensor unit (ex. see non-patent document 1).

According to this residual gas analyzer, residual gas introduced into the ionizer is initially influenced by a thermal electron discharged from a filament at high temperatures and ionized. Generated ions are focused and accelerated by a lens, and introduced to the mass spectrometer. In the mass spectrometer, direct and alternating current voltages are applied to cylindrical electrodes of four (quadrupole) so that ions are sieved. Separated ions are detected as a current by a Faraday cup in the detector. This ion current is changed according to an amount of residual gas (partial pressure), so that the residual gas can be accurately measured.

However, as the ambient pressure in a vacuum chamber increases, the mean free path decreases and therefore the probability of ion-gas collisions in the quadrupole increases hence inhibiting the ion from reaching the detector. Therefore ion collisions inside the mass spectrometer will cause a drop in the sensor sensitivity. Such a drop increases with the ambient pressure. Therefore, when an ambient pressure in which the quadrupole is arranged exceeds a predetermined pressure (ex. about $1 \times 10^{-2}$ to $1 \times 10^{-1}$ Pa), an ion current reaches saturation. Accordingly, the ion current is decreased after exceeding its peak value (see FIG. 6).

Meanwhile, if the cylindrical electrodes included within the quadrupole are made shorter, the probability of collisions between the ions passing through the quadrupole and the gas is small even at higher ambient pressures, and a measurement can be realized even in an ambient pressure which is equal to or larger than the predetermined value.

However, the shorter cylindrical electrodes cause a problem of resolution reduction.

As shown in Patent Document 1, there is a conventional gas analyzer which provides a total pressure measurement section (code 11 in Patent Document 1) for measuring a total pressure in the vicinity of the ionizer, so that a partial pressure being a measurement pressure is corrected by using the total pressure in the vicinity of the ionizer.

However, the gas analyzer as described above has a problem that an accurate correction cannot be realized even if a partial pressure is corrected by using the total pressure, unless the total pressure has an accurate measurement pressure used for a correction. In practice, the total pressure which was thus measured stops being proportional to a change of an ambient pressure when the ambient pressure becomes higher than a predetermined pressure (about $1 \times 10^{-1}$ to 1 Pa) as described above. In particular, there is a problem that the partial pressure cannot be corrected using the total pressure when the total pressure exceeds its peak value.

Non-patent Document 1: "Feature article: Microminiaturized residual gas analyzer, PressureMaster RGA series" by Toni Ikeda, Horiba Technical Reports, Horiba, Ltd., March 2004, No. 28, pp. 12-15

Patent Document 1: Japanese Unexamined Patent Publication No. 1999-31473

DISCLOSURE OF THE INVENTION

Problems to be Solved by the Invention

The present invention was achieved to solve the above described problems at once, and a main object thereof is to allow a correction in a region in which a measurement pressure stops increasing in proportion to a change of an ambient pressure, while maintaining mass resolution.

Means to Solve the Problems

The gas analyzer according to the present invention is specifically characterized by including: an ionizer to ionize a sample gas; a first ion detector and a second ion detector, each configured to detect a respective ion from the ionizer, and each being disposed a respective distance from the ionizer on an opposite side of the ionizer, the respective distances being different from each other, a filter interposed between the ionizer and the first ion detector to selectively allow ions from the ionizer to pass therethrough; and an arithmetic device to correct a partial pressure of a specific component obtained from the first ion detector and selected by the filter by using a first total pressure of the sample gas obtained from the first ion detector and a second total pressure of the sample gas obtained from the second ion detector.

In the gas analyzer as described above, the first total pressure and the second total pressure of sample gas respectively obtained from the first ion detector and the second ion detector, each of which has a different distance from the ionizer, are used to correct a partial pressure of a selected ion, so that a correction can be performed in a pressure region in which a measurement pressure in the two ion detectors is decreased after exceeding its peak value with respect to an increase of an ambient pressure, for example, while maintaining mass resolution. That is, a limit value (partial pressure measurement limit value) which allows a conventional measurement of a partial pressure can be shifted to a high pressure side as much as possible. Moreover, due to the configuration of interposing the filter between the first ion detector and the ionizer, the second ion detector may be arranged simply across the ionizer in relation to the first ion detector in addition to a conventional configuration of the gas analyzer using a mass spectrometric method such as a quadrupole mass spectrometric method, so that an existing gas analyzer can be used without making any changes.

As a detailed correction method, the arithmetic device is considered to correct the partial pressure by using a ratio of the first total pressure to the second total pressure.

A method of correcting a measurement result using the gas analyzer is also characterized by including: a first total pressure measurement step to measure a first total pressure of the sample gas by the first ion detector; a second total pressure measurement step to measure a second total pressure of the sample gas by the second ion detector; a partial pressure measurement step to use the first ion detector to measure a partial pressure of a selected ion which was selected by the filter; and a correction step to correct the partial pressure by using the first total pressure and the second total pressure.

Furthermore, a gas analyzer correction program according to the present invention is a gas analyzer correction program which is executed in a gas analyzer including: an ionizer to ionize a sample gas; a first ion detector and a second ion detector each configured to detect a respective ion from the ionizer, and each being disposed a respective distance from the ionizer on an opposite side of the ionizer, the respective distances being different from each other, a filter interposed between the ionizer and the first ion detector to selectively allow ions that were ionized to pass therethrough; and an arithmetic device, wherein the arithmetic device is provided with a function to correct a partial pressure of a specific component obtained from the first ion detector and selected by the filter by using the first total pressure of the sample gas obtained from the first ion detector and the second total pressure of the sample gas obtained from the second ion detector.

A gas analyzer arithmetic device according to the present invention is a gas analyzer arithmetic device used for a gas analyzer including: an ionizer to ionize a sample gas; a first ion detector and a second ion detector each configured to detect a respective ion from the ionizer, and each being disposed a respective distance from the ionizer on an opposite side of the ionizer, the respective distances being different from each other, and a filter interposed between the ionizer and the first ion detector to selectively allow an ion from the ionizer to pass therethrough, wherein a first total pressure of the sample gas obtained from the first ion detector and a second total pressure of the sample gas obtained from the second ion detector are used to correct a partial pressure of a specific component obtained from the first ion detector and selected by the filter.

In a semiconductor manufacturing device using the gas analyzer according to the present invention, preferable semiconductor manufacturing can be realized. To be more specific, the gas analyzer according to the present invention is suitably used for monitoring specific gas during sputtering and vacuum deposition and measuring residual gas obtained after sputtering and vacuum deposition. It is also suitably used for measuring residual gas after etching, after CVD, and after cleaning a chamber.

EFFECTS OF THE INVENTION

Thus configured present invention enables to correct a measurement pressure in a region in which the measurement pressure stops to increase in proportion to a change of an ambient pressure, while maintaining a resolution.

DESCRIPTION OF REFERENCE NUMERALS

Figure 1:
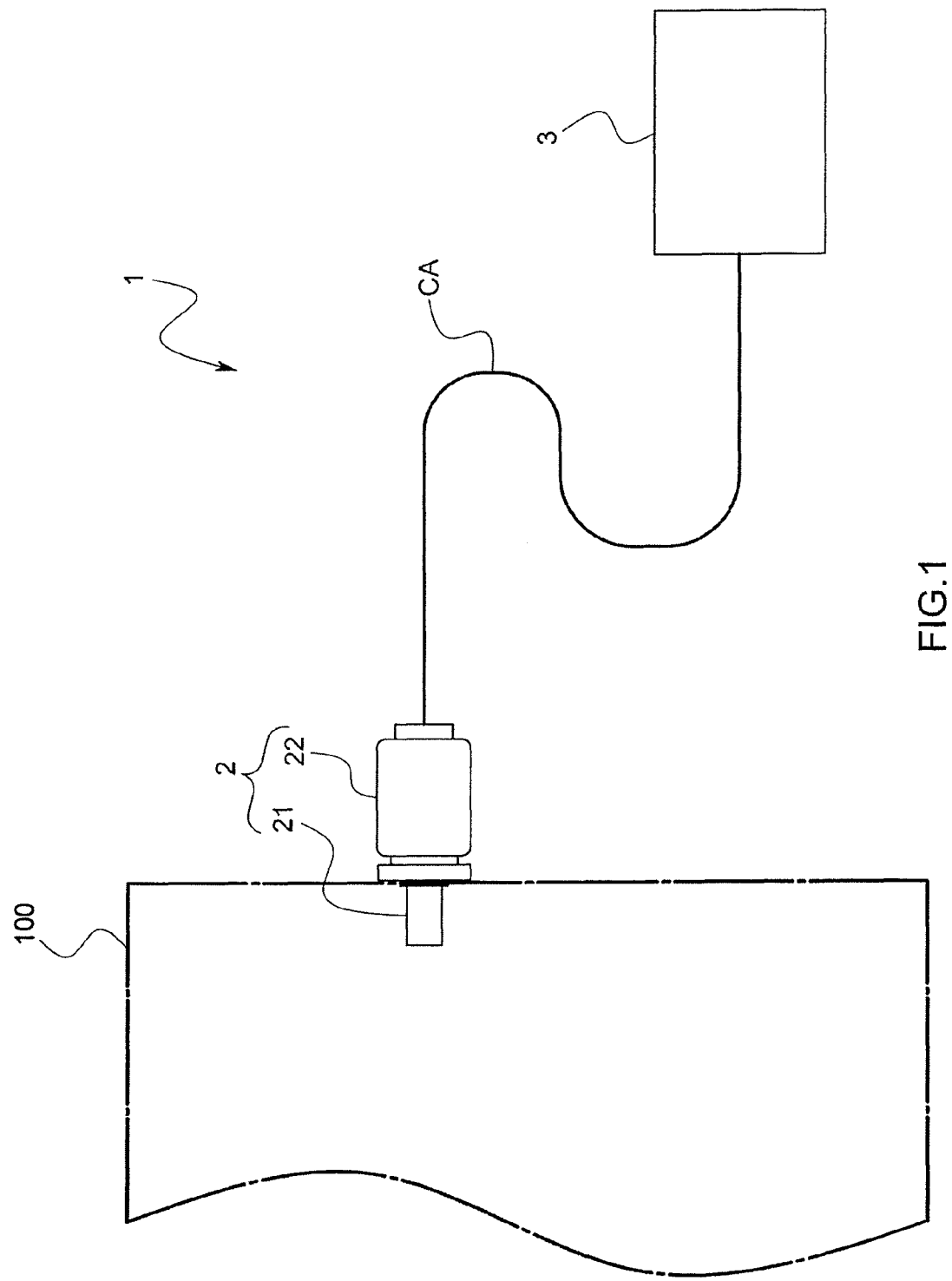
FIG. 1 is a model configuration diagram of a gas analyzer according to one embodiment of the present invention.

1 Gas analyzer
$TP_1$ First total pressure
$TP_2$ Second total pressure
$PP_1$ Partial pressure of a specific component
2 Sensor unit
21 Sensor
211 Ionizer
212 First ion detector
213 Second ion detector
214 Quadrupole
21 AC generator unit
3 Arithmetic device

BEST MODE FOR CARRYING OUT THE INVENTION

Figure 2:
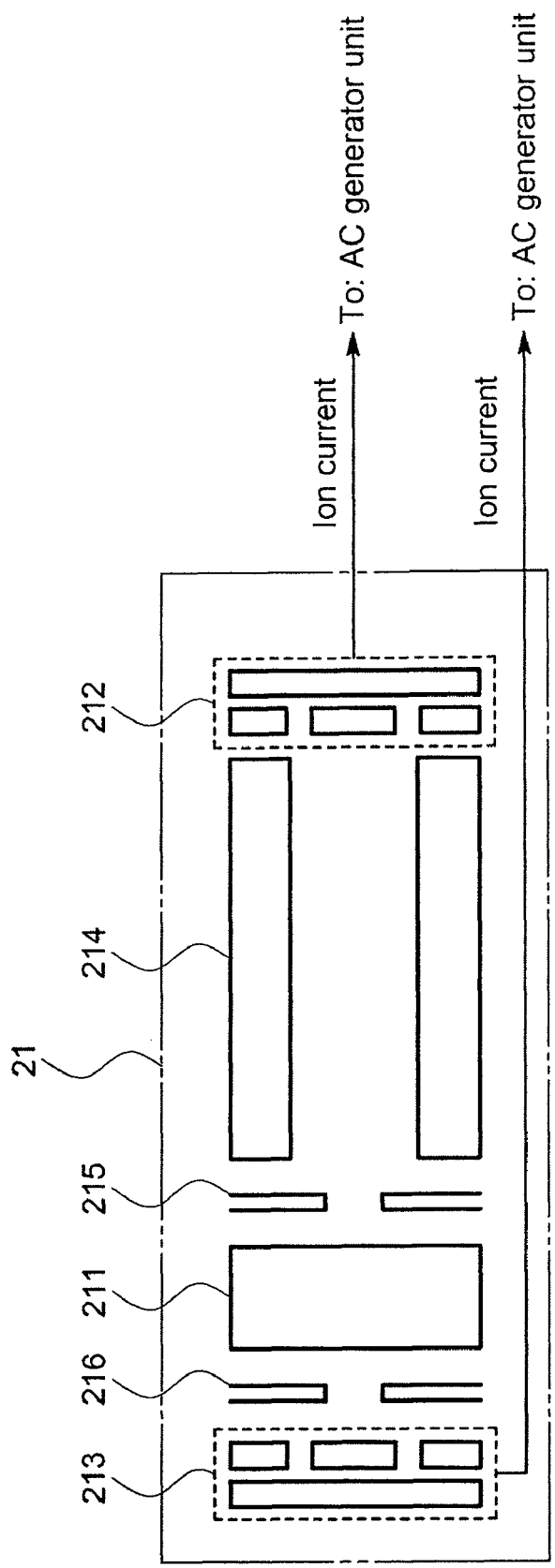
FIG. 2 is an internal configuration diagram of a sensor in the embodiment.

Explained below will be one embodiment of the present invention referring to diagrams. FIG. 1 is a model configuration diagram showing a gas analyzer 1 according to the present invention. FIG. 2 is an internal configuration diagram of a sensor 21.

<Device Configuration>

The gas analyzer 1 according to the present invention is used for monitoring gas in a vacuum chamber 100 during a semiconductor manufacturing process and after device cleaning for example, including: a sensor unit 2 having the sensor 21 for detecting process gas and sample gas such as residual gas in the vacuum chamber 100; and an arithmetic device 3 for controlling the sensor 21 while processing an analysis of residual gas on the basis of an output from the sensor 21, as shown in FIG. 1.

The sensor unit 2 and the arithmetic device 3 will be explained below.

The sensor unit 2 is provided with the sensor 21 and an AC generator unit 22 or the like which is disposed at a rear end portion of the sensor 21, as shown in FIG. 1. A cable CA is connected at a rear end of the AC generator unit 22 to connect the arithmetic device 3 and the sensor unit 2.

As shown in FIG. 2, the sensor 21 is provided with a gas inlet (not shown) for introducing residual gas in the vacuum chamber 100 when the sensor 21 is attached to the vacuum chamber 100, and includes an ionizer 211 to ionize residual gas being a sample gas introduced into the sensor 21 from the gas inlet, a first ion detector 212 and a second ion detector 213 configured to detect an ion from the ionizer 211 which are disposed on opposite sides of the ionizer 211, each respective ion detector being disposed a respective distance from the ionizer, and each respective distance being different from the other, and a quadrupole 214 as a filter to be interposed between the ionizer 211 and the first ion detector 212 to selectively allow an ion from the ionizer 211 to pass therethrough.

The ionizer 211 is internally provided with a filament, in which the sample gas is ionized by a thermal electron discharged from the filament. An ion generated by the ionizer 211 is then extracted by a first extraction electrode 215 or a second extraction electrode 216. The first extraction electrode 215 and the second extraction electrode 216 are both configured by a single electrode or a plurality of electrodes. The first extraction electrode 215 is interposed between the ionizer 211 and the quadrupole 214, and extracts an ion generated by the ionizer 211 towards the quadrupole 214 and the first ion detector 212, while also accelerating and focusing that ion. The second extraction electrode 216 is interposed between the ionizer 211 and the second ion detector 213, and extracts an ion generated by the ionizer 211 towards the second ion detector 213, while also accelerating and focusing that ion.

The quadrupole 214 separates an ion beam focused and accelerated by the first extraction electrode 215, in accordance with a ratio of the electric charge to the mass of the ion. To be more specific, the quadrupole 214 is composed of two pairs of opposite electrodes (cylindrical electrodes) arranged at an interval of 90 degrees, in which the electrodes that are diagonally opposed to each other are made to have the same potential, and a direct current voltage U superimposed on a high-frequency voltage Vcosωt is applied between the respective pairs of the electrodes having a phase shift of 90 degrees, sustaining the U/V ratio in a constant state while changing V, so that an ion which was made incident in the opposite electrodes is selectively made to pass therethrough in accordance with a ratio of mass to the number of charge.

The first ion detector 212 is a Faraday cup which captures an ion separated by the quadrupole 214 and detects an ion current. To be more specific, the first ion detector 212 detects an ion of a specific component which was separated by the quadrupole 214 to detect a partial pressure $PP_1$ in sample gas of the specific component. The first ion detector 212 also detects all ions of the sample gas that were ionized by the ionizer 211 to detect a total pressure $TP_1$ of the sample gas.

The second ion detector 213 is a Faraday cup to capture an ion which was made to converge by the second extraction electrode 216 and detects an ion current. To be more specific, the second ion detector 213 detects all ions that were ionized to detect a total pressure $TP_2$ of the sample gas.

Explanation will be made for a detailed arrangement form of the first ion detector 212 and the second ion detector 213.

As described above, the first ion detector 212 and the second ion detector 213 are disposed so as to be on opposite sides of the ionizer 211. That is, relative to the ionizer 211, the first ion detector 212 is disposed on the same side with respect to the quadrupole 214. The second ion detector 213 is disposed on an opposite side of the quadrupole 214 with respect to the ionizer 211. As a result, the ionizer 211, the quadrupole 214, the first ion detector 212, and the second ion detector 213 are arranged to be on the same line of sight. The first ion detector 212 and the second ion detector 213 are also arranged to have a mutually different distance X from the ionizer 211. More specifically, an arrangement is made so that a distance X1 from the ionizer 211 to the first ion detector 212 is larger than a distance X2 from the ionizer 211 to the second ion detector 213.

The AC generator unit 22 converts ion currents detected by the first ion detector 212 and the second ion detector 213 into digital voltage signals showing a voltage value and the voltage signals are transferred to the arithmetic device 3.

A circuit part (not shown) on which a CPU and an internal memory or the like are mounted is incorporated in the arithmetic device 3 (device main body), and the CPU and a peripheral device are operated in accordance with a program stored in the internal memory, so that the arithmetic device 3 processes an analysis of the sample gas on the basis of outputs from the sensor 21.

Explained below will be details of the arithmetic device 3 and method of correcting the partial pressure $PP_1$ of a specific component of the sample gas and the total pressure $TP_1$ of the sample gas.

<First Total Pressure Measurement Step>

A first total pressure measurement step is a step to detect ions generated by the ionizer 211 using the first ion detector 212 to measure the first total pressure $TP_1$ of the sample gas. That is, the arithmetic device 3 applies a voltage to the first extraction electrode 215 to inject all ions of a sample gas generated by the ionizer 211 to the first ion detector 212, while controlling a power supply not shown in the drawings so as not to apply a voltage to the quadrupole 214 and the second extraction electrode 216. Therefore, all generated ions are detected by the first ion detector 212. An ion current from the first ion detector 212 is then converted into a digital voltage signal by the AC generator unit 22 so as to be transferred to the arithmetic device 3. Furthermore, the arithmetic device 3 receives a digital voltage signal to calculate the first total pressure $TP_1$, while storing the first total pressure data in a storage section not shown.

<Second Total Pressure Measurement Step>

A second total pressure measurement step is a step to detect an ion generated by the ionizer 211 using the second ion detector 213 to measure a second total pressure $TP_2$ of the sample gas. That is, the arithmetic device 3 applies a voltage to the second extraction electrode 216 to inject all ions of the sample gas generated by the ionizer 211 to the second ion detector 213, while maintaining the first extraction electrode 215 at the same voltage bias as the ionizer 211. Therefore, all generated ions are entirely detected by the second ion detector 213. An ion current from the second ion detector 213 is then converted into a digital voltage signal by the AC generator unit 22 so as to be transferred to the arithmetic device 3. The arithmetic device 3 also receives the digital voltage signal to calculate the second total pressure $TP_2$, while storing the second total pressure data in a storage section not shown.

<Partial Pressure Measurement Step>

A partial pressure measurement step is a step to exclusively detect an ion of a specific component (selected ion) out of generated ions by using the first ion detector 212 to measure the partial pressure $PP_1$ of the specific component. That is, the arithmetic device 3 applies a voltage to the first extraction electrode 215 to inject all ions of the sample gas generated by the ionizer 211 to the quadrupole 214, while controlling the power supply so that an ion of a specific mass-to-charge ratio is filtered through the quadrupole 214. Therefore, only the ion of the specific component is detected by the first ion detector 212. An ion current from the first ion detector 212 is then converted into a digital voltage signal by the AC generator unit 22 so as to be transferred to the arithmetic device 3. The arithmetic device 3 also receives a digital voltage signal to calculate the partial pressure $PP_1$ of a specific component, while storing partial pressure data of the specific component in a storage section not shown.

The order of performing the first total pressure measurement step, the second total pressure measurement step, and the partial pressure measurement step is not limited to the above described order, and these steps can be performed in no special order.

<Correction Step>

A correction step is a step to correct the partial pressure $PP_1$ of the specific component calculated in the partial pressure measurement step, and the total pressure $TP_1$ of the sample gas calculated in the first total pressure measurement step. To be more specific, the arithmetic device 3 corrects the partial pressure $PP_1$ by the equation below using a ratio of the first total pressure $TP_1$ obtained from the first total pressure step and the second total pressure $TP_2$ obtained from the second total pressure step ($TP_2/TP_1$ or $TP_1/TP_2$), the distance X1 from the ionizer 211 to the first ion detector 212, and the distance X2 from the ionizer 211 to the second ion detector 213. $PP_0$ in the equation indicates a corrected partial pressure.

$$PP_0 = PP_1 \times \alpha \qquad \text{[Equation 1]}$$

α is a function made by X1, X2, and $$\frac{TP_2}{TP_1}.$$

Indicated here is that X1 is a distance form the ionizer 211 to the first ion detector 212 and X2 is a distance from the ionizer 211 to the second ion detector 213.

To be more specific, the partial pressure $PP_1$ is corrected by an equation below.

$$PP_0 = PP_1 \times \exp\left\{\frac{X1}{X1-X2}\ln\left(\frac{TP2}{TP1}\right)\right\}$$ [Equation 2]

The arithmetic device 3 also corrects the total pressure $TP_1$ by an equation below. $TP_0$ in the equation indicates a corrected total pressure.

$$TP_0 = TP_1 \times \beta$$ [Equation 3]

$\beta$ is a function made by X1, X2, and $$\frac{TP_2}{TP_1}.$$

Indicated here is that X1 is a distance from the ionizer 211 to the first ion detector 212 and X2 is a distance from the ionizer 211 to the second detector 213.

To be more specific, the total pressure $TP_1$ is corrected by an equation below.

$$TP_0 = TP_1 \times \exp\left\{\frac{X1}{X1-X2}\ln\left(\frac{TP2}{TP1}\right)\right\}$$ [Equation 4]

The arithmetic device 3 is then outputs the partial pressure $PP_0$ of the specific component and the total pressure $TP_0$ of the sample gas that were thus corrected, in a display section not shown or the like.

Figure 3:
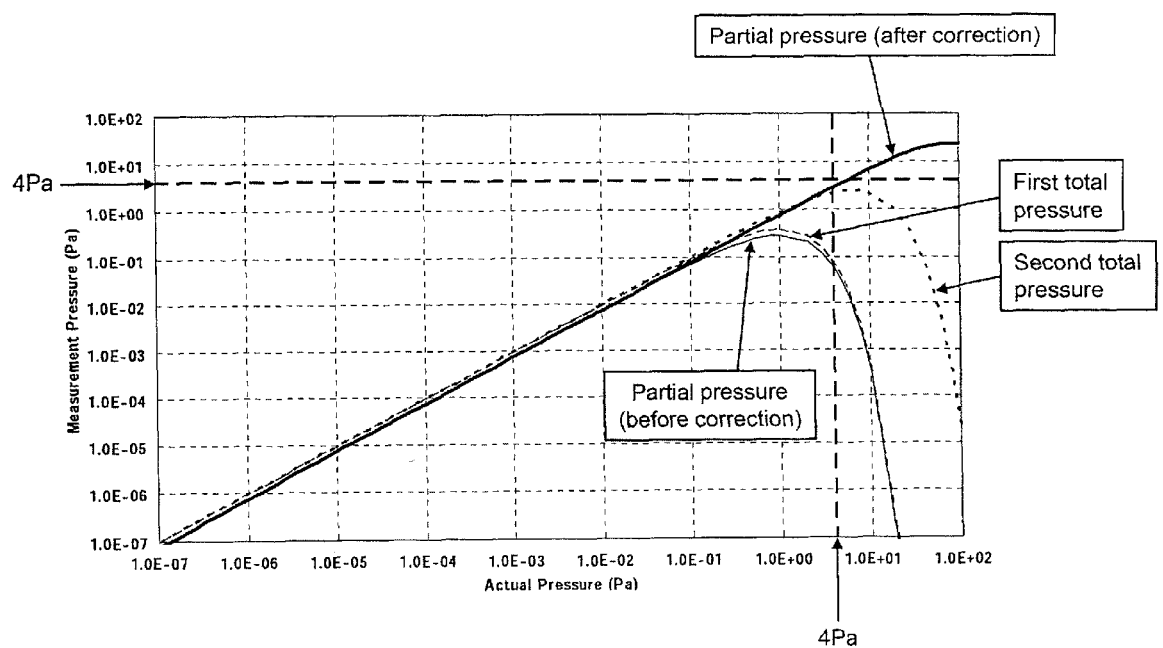
FIG. 3 is a diagram showing a correction result in a case of measuring a partial pressure of $N_2$ contained in sample gas.
Figure 4:
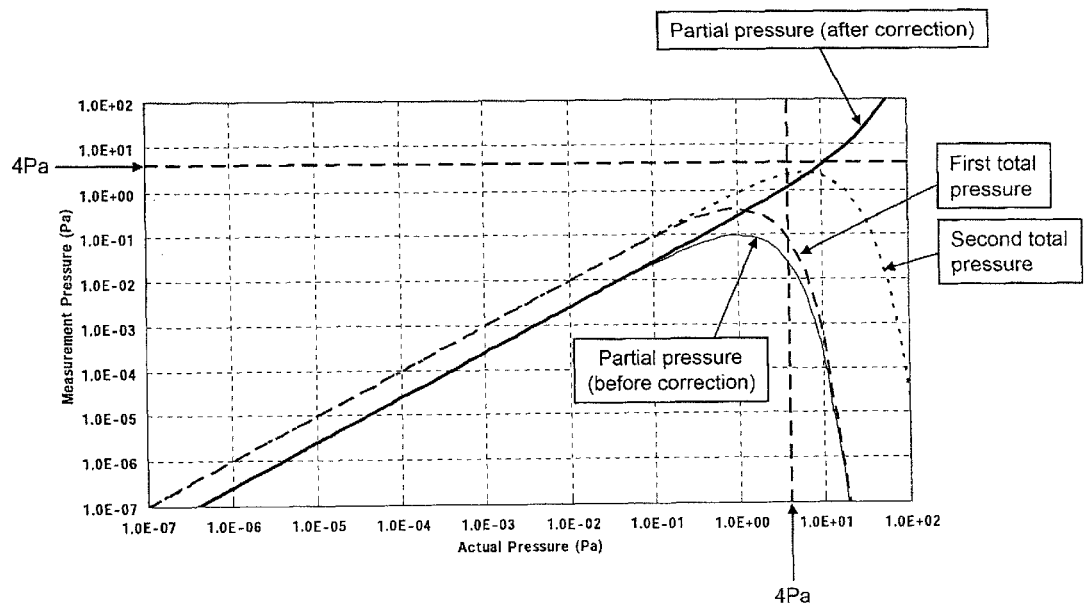
FIG. 4 is a diagram showing a correction result in a case of measuring a partial pressure of Ar contained in the sample gas.

Next, shown in FIGS. 3 and 4 is a measurement result in a case of measuring $N_2$ and Ar contained in the sample gas by using the gas analyzer 1 according to the present embodiment.

FIG. 3 is a diagram showing a result of correcting the partial pressure $PP_1$ of nitrogen gas ($N_2$) contained in the sample gas. It is understood from FIG. 3 that the partial pressure $PP_1$ of $N_2$ in the sample gas is corrected in a pressure range with a slowing rate of increase of about 0.6 to $10^2$ Pa, in which the rate of increase of the first total pressure $TP_1$ and the second total pressure $TP_2$ are slowed down, particularly a pressure range of about 1 to $10^2$ Pa in which a measurement pressure of the first total pressure $TP_1$ and the second total pressure $TP_2$ exceeds its peak. In a pressure range of $10^{-7}$ to 0.6 Pa in which the first total pressure $TP_1$ and the second total pressure $TP_2$ are substantially equal ($TP_2/TP_1 \approx 1$), a measurement pressure of the $PP_1$ is increased in proportion to an actual pressure, so that no correction is required.

FIG. 4 is a diagram which shows a result of correcting the partial pressure $PP_1$ of argon gas (Ar) contained in the sample gas. It is understood from FIG. 4 that the partial pressure $PP_1$ of Ar in the sample gas is corrected in a pressure range with a slowing rate of increase of about $10^{-1}$ to $10^2$ Pa in which the rate of increase of the first total pressure $TP_1$ and the second total pressure $TP_2$ are slowed down, particularly a pressure range of about 1 to $10^2$ Pa in which a measurement pressure of the first total pressure $TP_1$ and the second total pressure $TP_2$ exceeds it peak.

<Advantage of the Present Embodiment>

In the gas analyzer 1 according to the present embodiment with the configuration as described above, the partial pressure $PP_1$ of the specific component is corrected by using the first total pressure $TP_1$ and the second total pressure $TP_2$ obtained from the first ion detector 212 and the second ion detector 213 in which the distance X from the ionizer 211 is differentiated, so that a correction can be performed even in a pressure range of about 1 to $10^2$ Pa in which a measurement pressure of the two ion detectors 212 and 213 is decreased after exceeding its peak with respect to, for example, an increase of an ambient pressure, while maintaining a resolution. That is, a limit value (partial pressure measurement limit value) to allow a conventional measurement of a partial pressure can be extended to a higher pressure as much as possible.

Moreover, due to the first ion detector 212 which is used for both measuring the total pressure $TP_1$ of the sample gas and measuring the partial pressure $PP_1$ of the specific component, and due to the configuration of interposing the quadrupole 214 between the first ion detector 212 and the ionizer 211, a device configuration can be simplified, while the second ion detector 213 may be disposed simply across the ionizer 211 in relation to the first ion detector 212 in addition to a conventional configuration of the gas analyzer 1 using the quadrupole mass spectrometric method, so that an existing gas analyzer 1 can be used without making any change.

<Another Modified Embodiment>

The present invention is not limited to the above described embodiment. In explanation below, a member corresponding to the above described embodiment is provided with the identical code.

Figure 5:
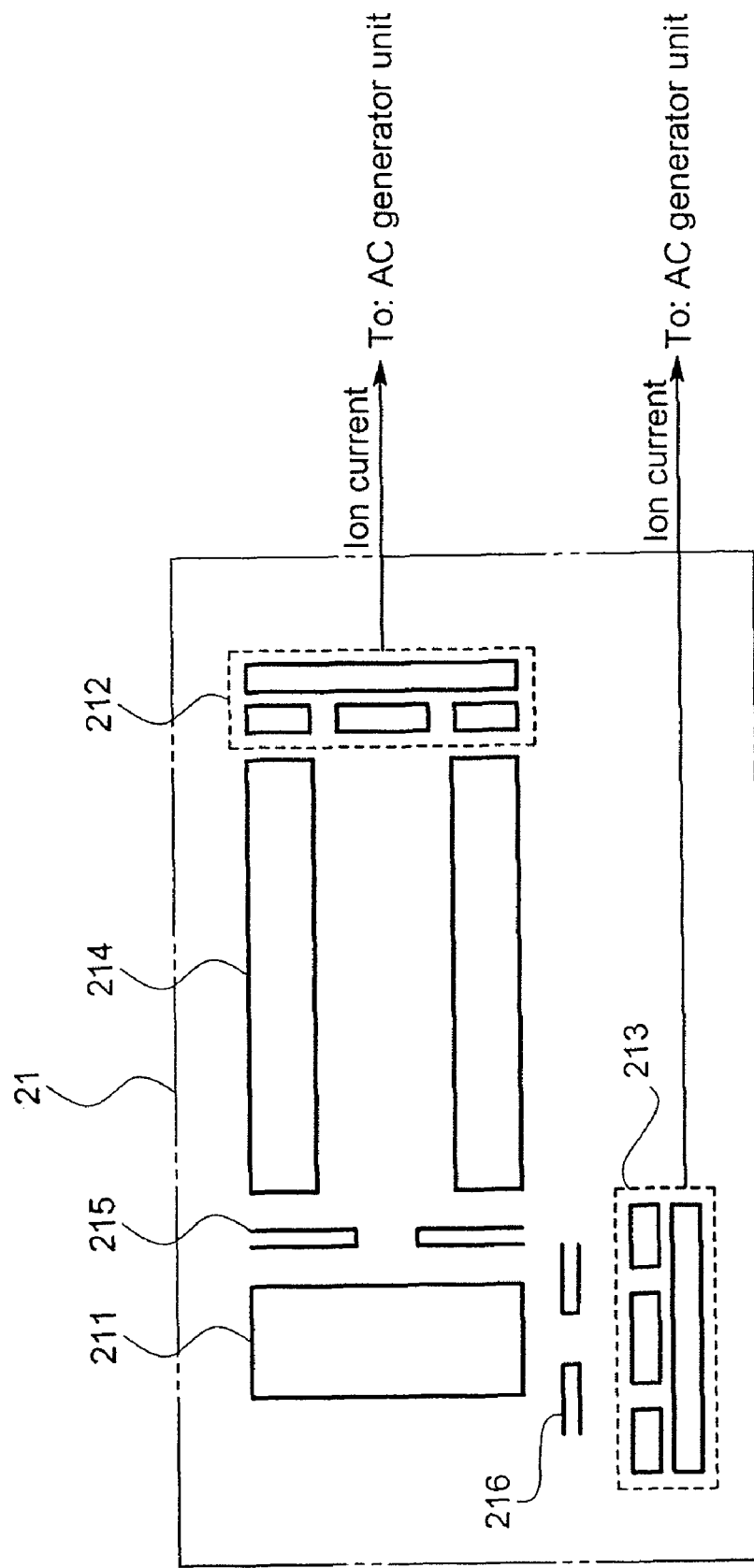
FIG. 5 is an internal configuration diagram of the sensor according to a modified embodiment.
Figure 6:
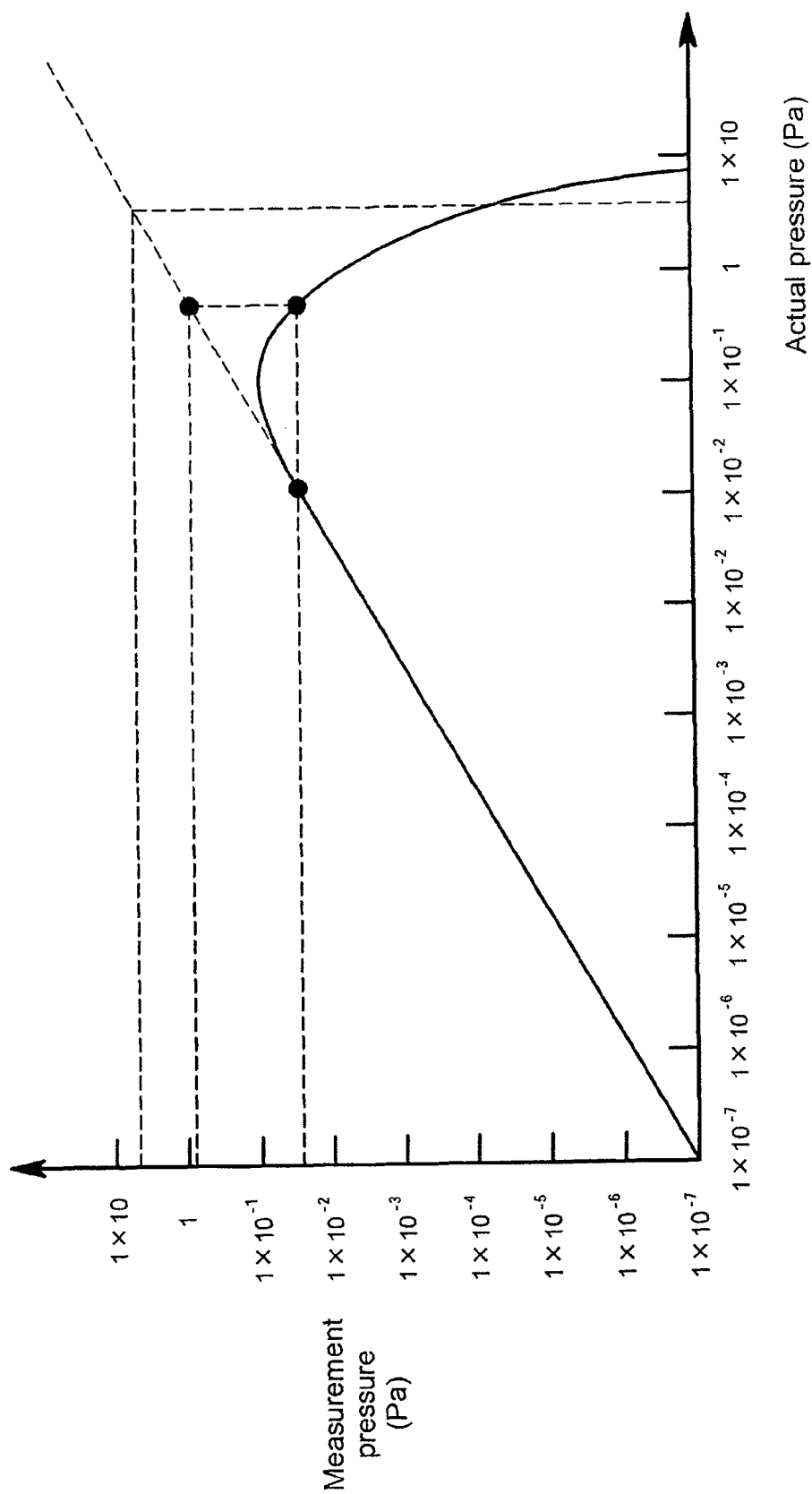
FIG. 6 is a diagram showing a measurement result of a conventional gas analyzer.

For example, the first ion detector 212 and the second ion detector 213 are arranged on a straight line with the ionizer 211 and the quadrupole 214 in the above described embodiment, but an arrangement form is not limited to the above described embodiment as long as the second ion detector 213 is arranged across the ionizer 211 in relation to the first ion detector 212 as shown in FIG. 5 for example.

A secondary electron multiplier may also be used for the ion detector other than the Faraday cup. In this case, the detection sensitivity can be further increased.

Furthermore, in a case of measuring an unknown sample gas, the measured partial pressure $PP_1$ may be corrected by storing a cracking pattern in a database in advance and identifying a specific component contained in the sample gas with reference to the database.

In addition, the quadrupole is used as the filter in the above described embodiment, but a fan-shape magnetic field type, a double-focusing type by an electric field and a magnetic field, and an ion transmission type such as a flight time type may also be used. A combination of these types may also be used.

The embodiment described above and the modified embodiment may be appropriately combined partially or entirely, and the present invention is not limited to the above described embodiment, in which various kinds of modifications are allowed in a range without exceeding what is claimed in the present invention, as needless to say.

<Industrial Applicability>

The present invention enables to correct a measurement pressure in a region in which the measurement pressure stops to increase in proportion to a change of an ambient pressure, while maintaining a resolution.

The invention claimed is:

1. A gas analyzer comprising:
    an ionizer to ionize sample gas;
    a first ion detector and a second ion detector, each configured to detect a respective ion from the ionizer, and each being disposed a respective distance from the ionizer on an opposite side of the ionizer, the respective distances being different from each other;
    a filter interposed between the ionizer and the first ion detector to selectively allow ions from the ionizer to pass therethrough; and an arithmetic device to correct a partial pressure of a specific component obtained from the first ion detector and selected by the filter by using a first total pressure of the sample gas obtained from the first ion detector and a second total pressure of the sample gas obtained from the second ion detector.

2. The gas analyzer according to claim 1, wherein the arithmetic device corrects the partial pressure by using a ratio of the first total pressure to the second total pressure.

3. A correction method of a gas analyzer equipped with an ionizer to ionize a sample gas, a first ion detector and a second ion detector each configured to detect a respective ion from the ionizer, and each being disposed a respective distance from the ionizer on an opposite side of the ionizer, the respective distances being different from each other, a filter interposed between the ionizer and the first ion detector to selectively allow ions that were ionized to pass therethrough, and an arithmetic device to analyze the sample gas by receiving a detection signal from the first ion detector and the second ion detector, the correction method comprising:
- a first total pressure measurement step to measure a first total pressure of the sample gas by the first ion detector;
- a second total pressure measurement step to measure a second total pressure of the sample gas by the second ion detector;
- a partial pressure measurement step to cause the first ion detector to measure a partial pressure of a specific component selected by the filter; and
- a correction step to correct the partial pressure by using the first total pressure and the second total pressure.

4. The correction method of the gas analyzer according to claim 3, wherein the partial pressure is corrected by using a ratio of the first total pressure to the second total pressure in the correction step.

5. A computation unit included in a gas analyzer equipped with an ionizer to ionize a sample gas, a first ion detector and a second ion detector each configured to detect a respective ion from the ionizer, and each being disposed a respective distance from the ionizer on an opposite side of the ionizer, the respective distances being different from each other, a filter interposed between the ionizer and the first ion detector to selectively allow ions from the ionizer to pass therethrough, and an arithmetic device, wherein
the arithmetic device executes a function to correct a partial pressure of a specific component obtained from the first ion detector and selected by the filter by using a first total pressure of the sample gas obtained from the first ion detector and a second total pressure of the sample gas obtained from the second ion detector.

6. A gas analyzer arithmetic device used for a gas analyzer comprising:
- an ionizer to ionize a sample gas;
- a first ion detector and a second ion detector each configured to detect a respective ion from the ionizer, and each being disposed a respective distance from the ionizer on an opposite side of the ionizer, the respective distances being different from each other; and
- a filter interposed between the ionizer and the first ion detector to selectively allow ions from the ionizer to pass therethrough, wherein a first total pressure of the sample gas obtained from the first ion detector and a second total pressure of the sample gas obtained from the second ion detector are used to correct a partial pressure of a specific component obtained from the first ion detector and selected by the filter.

7. A gas analyzer comprising:
- an ionizer to ionize sample gas;
- a first ion detector and a second ion detector, each configured to detect a respective ion from the ionizer, and each being disposed a respective distance from the ionizer on an opposite side of the ionizer, the respective distances being different from each other;
- a filter interposed between the ionizer and the first ion detector to selectively allow ions from the ionizer to pass therethrough; and
- an arithmetic device to correct a total pressure obtained from the first ion detector or the second ion detector by using a first total pressure of the sample gas obtained from the first ion detector and a second total pressure of the sample gas obtained from the second ion detector.

* * * * *